United States Patent
Park et al.

(10) Patent No.: US 11,062,379 B2
(45) Date of Patent: Jul. 13, 2021

(54) AUTOMATIC FASHION OUTFIT COMPOSITION AND RECOMMENDATION SYSTEM AND METHOD

(71) Applicants: IntelliSys Co., Ltd., Seoul (KR); Seoul National University R&DB Foundation, Seoul (KR)

(72) Inventors: Sung-Chan Park, Seoul (KR); Jin-Seok Seol, Seoul (KR); Chae-Min Ahn, Seoul (KR); Sang-Goo Lee, Seoul (KR)

(73) Assignees: INTELLISYS CO., LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 36 days.

(21) Appl. No.: 16/582,066

(22) Filed: Sep. 25, 2019

(65) Prior Publication Data

US 2020/0134694 A1    Apr. 30, 2020

(30) Foreign Application Priority Data

Oct. 26, 2018    (KR) .......................... 10-2018-0128734

(51) Int. Cl.
*G06Q 30/00*    (2012.01)
*G06Q 30/06*    (2012.01)
(Continued)

(52) U.S. Cl.
CPC ... *G06Q 30/0631* (2013.01); *G06F 16/24578* (2019.01); *G06F 16/9535* (2019.01); *G06F 16/9538* (2019.01); *G06Q 30/0625* (2013.01)

(58) Field of Classification Search
CPC combination set(s) only.
See application file for complete search history.

(56) References Cited

U.S. PATENT DOCUMENTS 8,103,551 B2 *   1/2012   Saul ...................... G06Q 30/02
                                                        705/26.1
10,803,509 B1 *  10/2020  Zhang ................ G06Q 30/0627
(Continued)

FOREIGN PATENT DOCUMENTS

JP    2012-014544 A    1/2012
JP    2016-015164 A    1/2016
(Continued)

OTHER PUBLICATIONS

Li, Yuncheng, et al. "Mining fashion outfit composition using an end-to-end deep learning approach on set data." IEEE Transactions on Multimedia 19.8 (2017): 1946-1955.*

*Primary Examiner* — Kathleen Palavecino
(74) *Attorney, Agent, or Firm* — Novick, Kim & Lee, PLLC; Jae Yoon Kim

(57) ABSTRACT

Provided is an automatic fashion outfit composition and recommendation method including a user's query item about fashion being input to a vendor item DB and the vendor item DB extracting the class and vector of the query item and transmitting the same to a reference DB, the reference DB retrieving and extracting similar items having vectors that are similar to the vector of the query item and then retrieving and extracting reference fashion outfit including the similar items, the reference DB extracting reference items included in the reference fashion outfit, computing the class and vector of each of the reference items, and transmitting the same to the vendor item DB, the vendor item DB retrieving and extracting recommended items having vectors that are similar to the vectors of the reference items, and the vendor item DB combining the query item and the recommended items to compose recommended fashion outfit and sorting and transmitting the recommended fashion outfit to a user.

19 Claims, 9 Drawing Sheets

(51) Int. Cl.
  *G06F 16/9535*  (2019.01)
  *G06F 16/9538*  (2019.01)
  *G06F 16/2457*  (2019.01)

(56) References Cited

U.S. PATENT DOCUMENTS

| | | | |
|---|---|---|---|
| 2017/0083789 A1* | 3/2017 | Shah | G06K 9/6256 |
| 2018/0211304 A1* | 7/2018 | Baxter | G06Q 10/083 |
| 2018/0218433 A1* | 8/2018 | Penner | G06N 20/00 |
| 2020/0257976 A1* | 8/2020 | Polan A Cabrera | G06N 3/08 |
| 2020/0302506 A1* | 9/2020 | Parker | G06N 20/00 |

FOREIGN PATENT DOCUMENTS

| | | |
|---|---|---|
| KR | 10-2012-0001506 A | 1/2012 |
| KR | 10-2014-0111225 A | 9/2014 |
| KR | 10-2014-0126072 A | 10/2014 |

* cited by examiner

AUTOMATIC FASHION OUTFIT COMPOSITION AND RECOMMENDATION SYSTEM AND METHOD

BACKGROUND OF THE INVENTION

Field of the Invention

The present invention relates to an automatic fashion outfit composition and recommendation system and method, and more particularly to an automatic fashion outfit composition and recommendation system and method capable of automatically selecting a set of fashion items that can be combined into a suitable outfit that can be worn as a set of clothing with the fashion item that is input by the user.

Description of the Related Art

With the proliferation of the Internet and smart devices, almost all kinds of products are being actively traded online. In particular, a customer who wishes to purchase fashion items, such as clothes, shoes, hats, etc., online accesses an Internet shopping site that sells such items, retrieves items presented by the site one by one, selects items that suit their taste, and pays for the selected items in order to purchase the fashion items.

Meanwhile, a vendor who runs a site for selling fashion items adds at least dozens and even hundreds of new items to the site every month in addition to existing fashion items. As a result, the customer may have a wide selection of clothes. For the same reason, however, the customer may have difficulty in finding the right item among an increased number of clothes.

In order to meet customers' needs in conveniently selecting fashion items, therefore, online fashion commerce sites have started to provide recommendation services for customers.

Conventionally, a user-based recommendation method and an item-based recommendation method are used as a method of providing a service of recommending clothes to customers. The user-based recommendation method and the item-based recommendation method are disclosed in Korean Registered Patent No. 1502681 entitled "CUSTOMIZED DISPLAY SYSTEM FOR ONLINE FASHION SITES AND CUSTOMIZED DISPLAY METHOD FOR ONLINE FASHION SITES USING THE SAME" and Korean Patent Application Publication No. 10-2014-111225 entitled "ELECTRONIC COMMERCE RECOMMENDATION ANALYSIS SYSTEM AND RECOMMENDATION ANALYSIS METHOD," respectively.

i) The user-based recommendation method is a method of recommending, to a customer of interest, clothes selected by a customer who is similar in physical conditions, preference styles, and tastes to the customer of interest, and ii) the item-based recommendation method is a method of recommending, to a customer of interest, clothes that are similar in physical conditions, preference styles, and tastes to clothes selected by the customer of interest in a site in the past.

In the conventional clothes recommendation schemes described above, however, the criterion based on which similarity of clothes is measured is not uniform, whereby objectivity is very insufficient. Furthermore, additional information, such as physical conditions of customers who purchased fashion items, styles and tastes of the items, and the number of clicks on the items, must be provided to the respective items in order to apply a recommendation method. As a result, demand for management of a clothes seller is increased.

Meanwhile, in recent years, the number of internet sites that provide a virtual experience service enabling a user to match or experience various classes of fashion clothes in advance has been increased. In such a virtual experience service, the user may select numerous styles of fashion items one by one in order to determine whether the selected item is suitable for their size or taste. Since the user selects numerous styles of items one by one, however, it is not possible to solve a problem in which much time and effort are incurred to find information about the item suitable to the user.

In addition, since the number of such online fashion sites has been increased and the amount of information about comparable fashion items has been increased, it is more difficult for the user to find information about the item suitable to the user. In particular, a scheme for automatically recommending items (e.g. a bottom and shoes) suitable for a fashion item (e.g. a top) that a customer likes has not yet been proposed.

That is, conventional technologies have problems in that fashion items are recommended based on fragmentary data, such as HTML data, search keywords, click view states, and purchase history of a customer of interest, whereby it is not possible to accurately satisfy the interest and satisfaction of the customer.

Therefore, there is a necessity for a fashion item recommendation scheme capable of automatically sorting and displaying recommended items such that a customer of interest completes fashion outfit with respect to a fashion item that the customer is favorably inclined toward, whereby it is possible to minimize the effort and time of the customer who purchases the fashion item and to increase purchasing need.

SUMMARY OF THE INVENTION

Therefore, the present invention has been made in view of the above problems, and it is an object of the present invention to provide an automatic fashion outfit composition and recommendation system and method capable of automatically combining fashion items suitable for a fashion item that is input by a user with the fashion item that is input by the user in order to present fashion outfit such that the user easily evaluates and purchases the fashion items.

It is another object of the present invention to provide an automatic fashion outfit composition and recommendation system and method capable of rapidly sorting a similar item, a reference item, and a recommended item using the class (part) and vector features of a fashion item in order to present a plurality of sets of completed fashion outfit, whereby it is possible to present fashion outfit capable of satisfying the user within a short time and thus to increase purchasing power while improving user satisfaction.

However, the objects to be accomplished by the invention are not limited to the above-mentioned objects, and other objects not mentioned will be clearly understood by those skilled in the art from the following description.

In accordance with an aspect of the present invention, the above and other objects can be accomplished by the provision of an automatic fashion outfit composition and recommendation method including (A) a user's query item about fashion being input to a vendor item DB and the vendor item DB extracting the class (part) and the vector of the query item and transmitting the extracted class (part) and vector of the query item to a reference DB, (B) the reference DB retrieving and extracting similar items having vectors that are highly similar to the vector of the query item and then retrieving and extracting reference fashion outfit including the similar items, (C) the reference DB extracting reference items included in the reference fashion outfit, computing the class (part) and the vector of each of the reference items, and transmitting the computed class (part) and vector of each of the reference items to the vendor item DB, (D) the vendor item DB retrieving and extracting recommended items having vectors that are highly similar to the vectors of the reference items, and (E) the vendor item DB combining the query item and the recommended items with each other in order to compose recommended fashion outfit, sorting the recommended fashion outfit, and transmitting the recommended fashion outfit to a user.

Step (A) may include a query item vector computation module of the vendor item DB extracting the class (part) and the vector of the query item and transmitting the extracted class (part) and vector of the query item to the reference DB.

Step (B) may include a similar item retrieval module of the reference DB retrieving and extracting similar items having vectors that are highly similar to the vector of the query item and a reference fashion outfit retrieval module of the reference DB retrieving and extracting reference fashion outfit including the similar items.

Step (C) may include separating and extracting reference items included in the reference fashion outfit through a reference item extraction module of the reference DB, and computing the class (part) and the vector of each of the reference items through a reference item vector computation module of the reference DB and transmitting the computed class (part) and vector of each of the reference items to the vendor item DB.

Step (D) may include a recommended item retrieval module of the vendor item DB retrieving and extracting recommended items having vectors that are highly similar to the vectors of the reference items.

Step (E) may include a recommended fashion outfit composition module of the vendor item DB combining the query item and the recommended items with each other in order to compose recommended fashion outfit, and a recommended fashion outfit sorting module of the vendor item DB sorting the recommended fashion outfit and displaying the recommended fashion outfit to the user in order of sorting.

Step (C) may include removing an item having the same class (part) as the query item from among the reference fashion outfit and extracting an item having a class (part) different from the class (part) of the query item as a reference item.

Step (C) may include retrieving and extracting reference fashion outfit in the order in which fit scores of fashion outfit that were input previously are relatively high through a reference fashion outfit evaluation module of the reference DB.

Step (E) may include sorting recommended fashion outfit in descending order based on the result obtained by multiplying two or more factors selected from among the fit score of reference fashion outfit, the value of similarity of a similar item, and the value of similarity of a recommended item or computing the mean value thereof and transmitting the recommended fashion outfit sorted in descending order to the user.

Step (B) may include a similar item retrieval module of the reference DB retrieving and extracting 5 to 10 similar items having vectors that are highly similar to the vector of the query item.

Step (D) may include a recommended item retrieval module of the vendor item DB retrieving and extracting 5 to 10 recommended items having vectors that are highly similar to the vectors of the reference items.

In accordance with another aspect of the present invention, there is provided an automatic fashion outfit composition and recommendation system including a vendor item DB and a reference DB, wherein the vendor item DB includes a query item vector computation module for extracting the class (part) and the vector of a user's query item that is input and transmitting the extracted class (part) and vector of the user's query item to the reference DB, a recommended item retrieval module for retrieving and extracting recommended items having vectors that are highly similar to vectors of reference items that are input from the reference DB, a recommended fashion outfit composition module for combining the user's query item and the recommended items with each other in order to compose recommended fashion outfit, and a recommended fashion outfit sorting module for sorting the recommended fashion outfit and transmitting the sorted recommended fashion outfit to a user in order of sorting, and wherein the reference DB includes a similar item retrieval module for retrieving and extracting similar items having vectors that are most highly similar to the vector of the query item, a reference fashion outfit retrieval module for retrieving and extracting reference fashion outfit including the similar items, a reference item extraction module for extracting reference items included in the reference fashion outfit, and a reference item vector computation module for computing the class (part) and the vector of each of the reference items and transmitting the computed class (part) and vector of each of the reference items to the vendor item DB.

The reference DB may further include a reference fashion outfit evaluation module for retrieving and extracting reference fashion outfit in consideration of the fit scores of fashion outfit.

The recommended fashion outfit sorting module may sort the recommended fashion outfit in descending order based on the result obtained by multiplying two or more factors selected from among the fit score of reference fashion outfit, the value of similarity of a similar item, and the value of similarity of a recommended item or computing the mean value thereof and transmits the recommended fashion outfit sorted in descending order to the user.

The reference fashion outfit may be a group of only fashion outfit to which consumers give predetermined scores or higher when a plurality of sets of fashion outfit is presented to the consumers in advance.

The class (part) of the item may be classified as a top, a bottom, a coat, shoes, a bag, or another accessory.

The query item may be input through a user terminal, or may be input through a display panel connected to the vendor item DB.

The similar item may be identical in class (part) to the query item.

The fashion outfit may be a set of fashion items including at least a top and a bottom or a set of fashion items further including at least one of shoes, a coat, a bag, or another accessory in addition to the top and the bottom.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
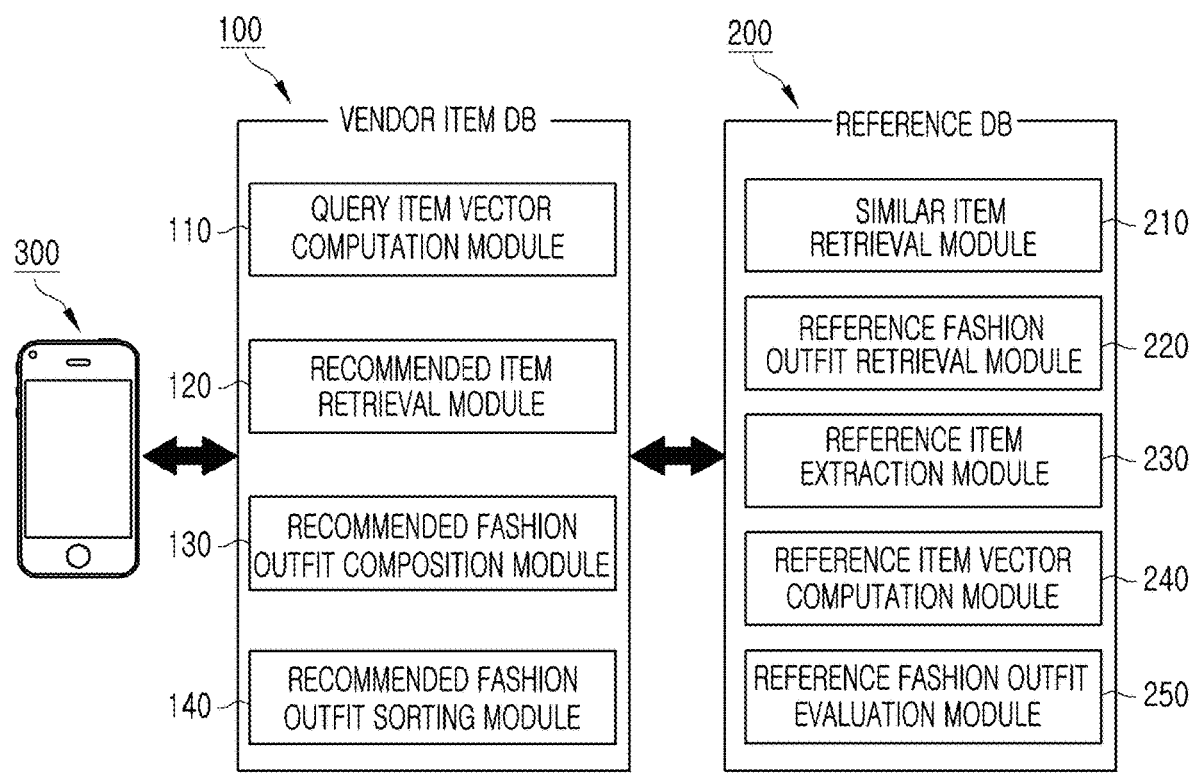
FIG. 1 is a view showing the construction of an automatic fashion outfit composition and recommendation system according to an embodiment of the present invention.

Hereinafter, embodiments of the present invention will be described in detail with reference to the accompanying drawings so that those skilled in the art can easily carry out the embodiments. The present invention may, however, be embodied in many different forms, and should not be construed as being limited to the embodiments set forth herein.

In order to clearly explain the present invention, illustration of elements having no connection with the description is omitted, and the same or similar elements are designated by the same reference numerals throughout the specification.

Further, it is to be understood that the phraseology and terminology used in the following specification and appended claims should not be construed as being limited to general or dictionary meanings but should be construed as having meanings and concepts according to the spirit of the present invention on the basis of the principle that the inventor is permitted to define appropriate terms for the best explanation.

In order to solve the problems with the conventional art, the present invention proposes an automatic fashion outfit composition and recommendation system and method, wherein deep learning technology is applied to a fashion item (a query item) that a user is favorably inclined toward or is interested in, a similar item, a reference item, and recommended items are sequentially extracted using the class (part) and mapped vector features of the fashion item, the recommended items are combined with the query item of the user, whereby it is possible to rapidly and automatically present a plurality of sets of recommended fashion outfit.

FIG. 1 is a view showing the construction of an automatic fashion outfit composition and recommendation system according to an embodiment of the present invention.

The automatic fashion outfit composition and recommendation system according to the embodiment of the present invention includes a vendor item database (DB) 100 and a reference DB 200.

The vendor item DB 100 may include a query item vector computation module 110 for extracting the class (part) and the vector of a user's query item that is input and transmitting the extracted class (part) and vector of the user's query item to the reference DB 200, a recommended item retrieval module 120 for retrieving and extracting recommended items having vectors that are highly similar to the vectors of reference items that are input from the reference DB 200, a recommended fashion outfit composition module 130 for combining the user's query item and the recommended items with each other in order to compose recommended fashion outfit, and a recommended fashion outfit sorting module 140 for sorting the recommended fashion outfit and transmitting the sorted recommended fashion outfit to the user in order of sorting.

Meanwhile, the reference DB 200 may include a similar item retrieval module 210 for retrieving and extracting similar items having vectors that are the most similar to the vector of the query item, a reference fashion outfit retrieval module 220 for retrieving and extracting reference fashion outfit including the similar items, a reference item extraction module 230 for extracting reference items included in the reference fashion outfit, and a reference item vector computation module 240 for computing the class (part) and the vector of each of the reference items and transmitting the computed class (part) and vector of each of the reference items to the vendor item DB 100.

Meanwhile, the reference DB 200 may further include a reference fashion outfit evaluation module 250 for retrieving and extracting reference fashion outfit in consideration of the fit scores of the fashion outfit.

The user's query item 410 may be an item that the user is interested in or is favorably inclined toward during the retrieval of fashion items. The user's query item 410, which is to be inquired from the vendor item DB 100, may be selected from among a plurality of fashion items, or may be input through a display panel (not shown) connected to the vendor item DB 100.

In the present invention, the class (part) and the vector of each of the query item 410, the similar item 420, the reference item 440, and the recommended item 450 may be extracted and used. Here, the class (part) of each item may be classified as a top, a bottom, a coat, shoes, a bag, or another accessory.

However, the present invention is not limited as to the classification in the class (part) of each item. As needed, the class (part) of each item may be classified as the class (part) of a men's item or the class (part) of a women's item. For example, i) the class (part) of the men's item may be specifically classified as a dress shirt, a T-shirt, a suit top, a suit bottom, a cardigan, a coat, shoes, a bag, a belt, a necktie, a necktie pin, a watch, or a hat, and ii) the class (part) of the women's item may be specifically classified as a blouse, a T-shirt, a suit top, a suit bottom, a one-piece dress, a two-piece dress, a cardigan, a coat, shoes, a bag, a scarf, a shawl, a watch, a necklace, a bracelet, or a bonnet. The extraction and use of the vector of each of the items will be described below in detail.

Preferably, the similar item 420 is identical in class (part) of the item to the query item 410. For example, in the case in which the query item 410 is a dress shirt, among tops, the similar item 420 may be extracted as a dress shirt, among tops.

The vector of the similar item 420 may be compared with the vector of the query item 410 in order to extract similar items 420 having the highest similarity from the reference DB 200, and 5 to 10 similar items having the highest similarity may be extracted in regular order. However, the present invention is not limited thereto. As needed, the similar items may be extracted within a range of 5 to 100.

In the present invention, the fashion outfit may be defined as a set of fashion items including at least a top and a bottom or a set of fashion items further including at least one of shoes, a coat, a bag, or another accessory in addition to the top and the bottom.

That is, the fashion outfit must include at least a top and a bottom. Furthermore, the fashion outfit must include at least one of shoes, a coat, a bag, or another accessory in addition to the top and the bottom according to a customer's request in order to provide a set of fashion items.

The reference fashion outfit 430 are fashion outfit including a similar item 420 that is extracted from the reference DB 200. In the case in which the extracted similar item 420 is a T-shirt, the reference fashion outfit may be a set of fashion items including a bottom and shoes in addition to the T-shirt.

The reference fashion outfit 430 are stored in the reference DB 200 in advance. A plurality of sets of fashion outfit may be presented to consumers in advance, and only fashion outfit to which the consumers give predetermined scores or higher may be collected and stored. For example, several hundred or thousand fashion outfit may be presented to consumers who participate in a survey, and fashion outfit having consumer satisfaction scores equal to or higher than 50 may be selected and stored.

The consumer satisfaction scores may be metadata that are also collected when the data on the reference fashion outfit 430 are collected, and may be values generated based on scores that users of various fashion sites give or the number of times that the users click on a favorite button.

The reference item 440 is an item that is different in class (part) from the query item 410, among items belonging to the reference fashion outfit 430. That is, in the case in which the query item 410 is a top, the reference item 440 must not be a top, and only a bottom, shoes, or another accessory may be extracted as the reference item.

The recommended item 450 is an item that is identical in class (part) to the reference item 440 and has a vector that is highly similar to the vector of the reference item 440, and may be an item falling within a user's demand range extracted from 5 to 100 items having vectors that are highly similar to the vector of the reference item 440, stored in the vendor item DB 100.

Since the recommended item 450 is an item having the same class (part) as the reference item 440, an item having a class (part) different from the class (part) of the query item 410.

The recommended fashion outfit 460 are a combination of the query item 410 and the recommended item 450. Since the query item 410 and the recommended item 450 are different items, the query item 410 and the recommended item 450 may be directly combined as a set of fashion items.

The recommended fashion outfit sorting module 140 sorts a plurality of sets of recommended fashion outfit 460, and displays the sorted recommended fashion outfit 460 to a user. At this time, sorting is performed as follows. The recommended fashion outfit 460 are sorted in descending order based on the result obtained by multiplying two or more factors selected from among the fit score of reference fashion outfit, the value of the similarity of a similar item, and the value of the similarity of a recommended item or computing the mean value thereof, and the recommended fashion outfit 460 sorted in descending order are transmitted to the user.

That is, the recommended fashion outfit 460 may be sorted in descending order based on the result of any one of [(the fit score of the reference fashion outfit)×(the value of the similarity of the similar item)], [(the fit score of the reference fashion outfit)×(the value of the similarity of the recommended item)], (the value of the similarity of the similar item)×(the value of the similarity of the recommended item)], and [(the fit score of the reference fashion outfit)×(the value of the similarity of the similar item)×(the value of the similarity of the recommended item)].

In addition, as needed, the recommended fashion outfit 460 may be sorted in descending order based on the result of any one of "the mean value of the fit score of the reference fashion outfit and the value of the similarity of the similar item," "the mean value of the fit score of the reference fashion outfit and the value of the similarity of the recommended item," "the mean value of the value of the similarity of the similar item and the value of the similarity of the recommended item," and "the mean value of the fit score of the reference fashion outfit, the value of the similarity of the similar item, and the value of the similarity of the recommended item."

Here, the mean value may be any one of an arithmetic mean value, a geometric mean value, and a harmonic mean value. Depending on circumstances, the mean value may be replaced with the linear sum based on linear combination.

The "fit score of the reference fashion outfit" is the mean score that consumers participating in a survey give, the "value of the similarity of the similar item" is the value of the similarity of the similar item with respect to the query item, and the "value of the similarity of the recommended item" is the value of the similarity of the similar item with respect to the reference item.

However, the criteria based on which the recommended fashion outfit 460 are sorted are not limited to the above illustrative examples, and the item attributes, consumer satisfaction, or vector feature of each of the query item, the similar item, the reference item, and the recommended item may be further combined so as to be used as criteria for sorting, as needed.

Here, the consumer satisfaction may be metadata that are also collected when information about each item is collected, and may be a value generated based on scores that users of various fashion sites give to each item, the number of times that the users click on a favorite button, the number of comments, and the number of page views. Each of the vendor item DB 100 and the reference DB 200 may simultaneously perform a function as a database for storing data therein and a function as a server, including various kinds of functional modules, for controlling the flow of data.

Figure 2:
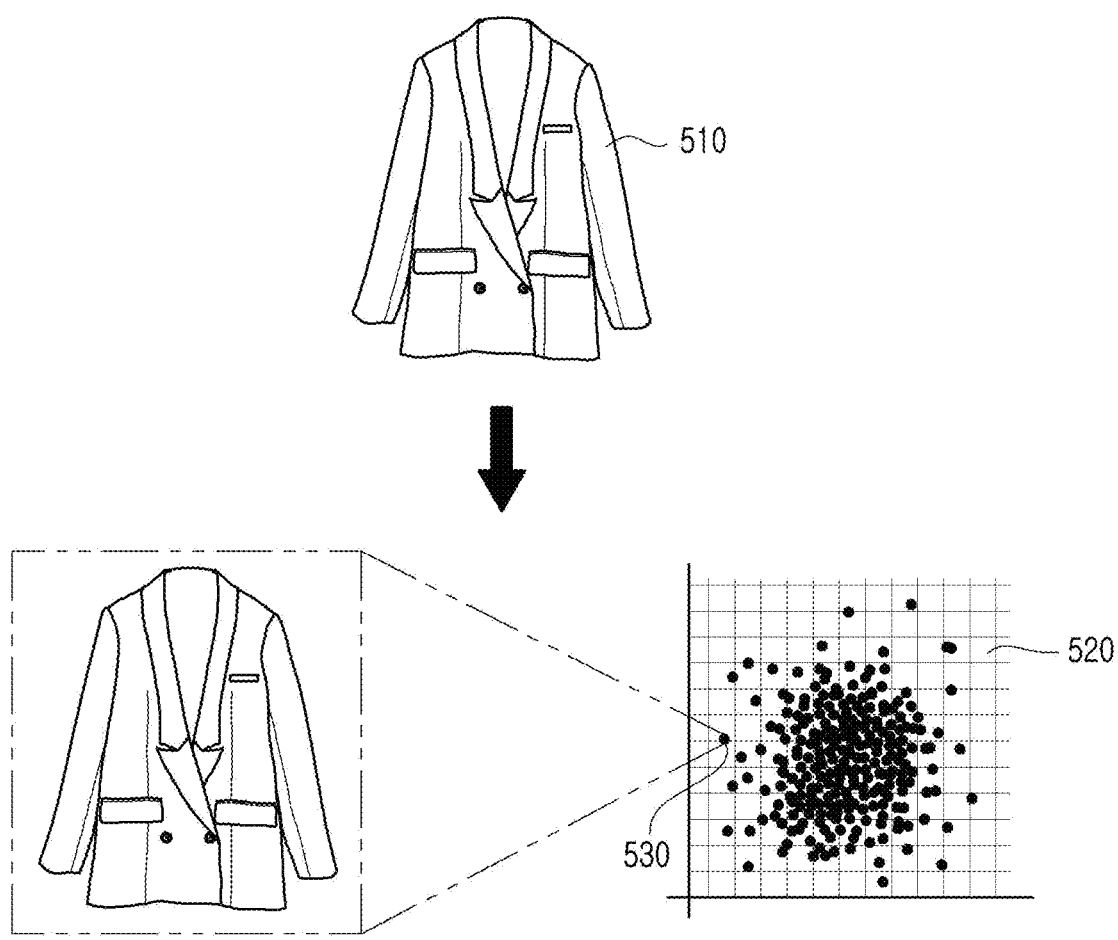
FIG. 2 is an illustrative view showing that a fashion item is mapped in a vector space according to an embodiment of the present invention.

FIG. 2 is an illustrative view showing that a fashion item is mapped in a vector space according to an embodiment of the present invention.

The vendor item DB 100 and the reference DB 200 of the present invention may store images and information of various fashion items, and may collect and store images and information of fashion items from domestic and foreign online fashion sites.

Meanwhile, each of the vendor item DB 100 and the reference DB 200 may map image data of a fashion item 510 on a specific position 530 in a predetermined vector space 520, and may acquire the class and vector information of the fashion item therefrom.

In the present invention, the vector of a fashion item may be a feature vector extracted from an image of each item, and may be extracted using a CNN-based image feature extraction scheme.

Also, in the present invention, similarity between various classes of items may be computed using a vector similarity computation scheme, such as a cosine similarity computation scheme or a Jaccard similarity computation scheme.

Figure 3:
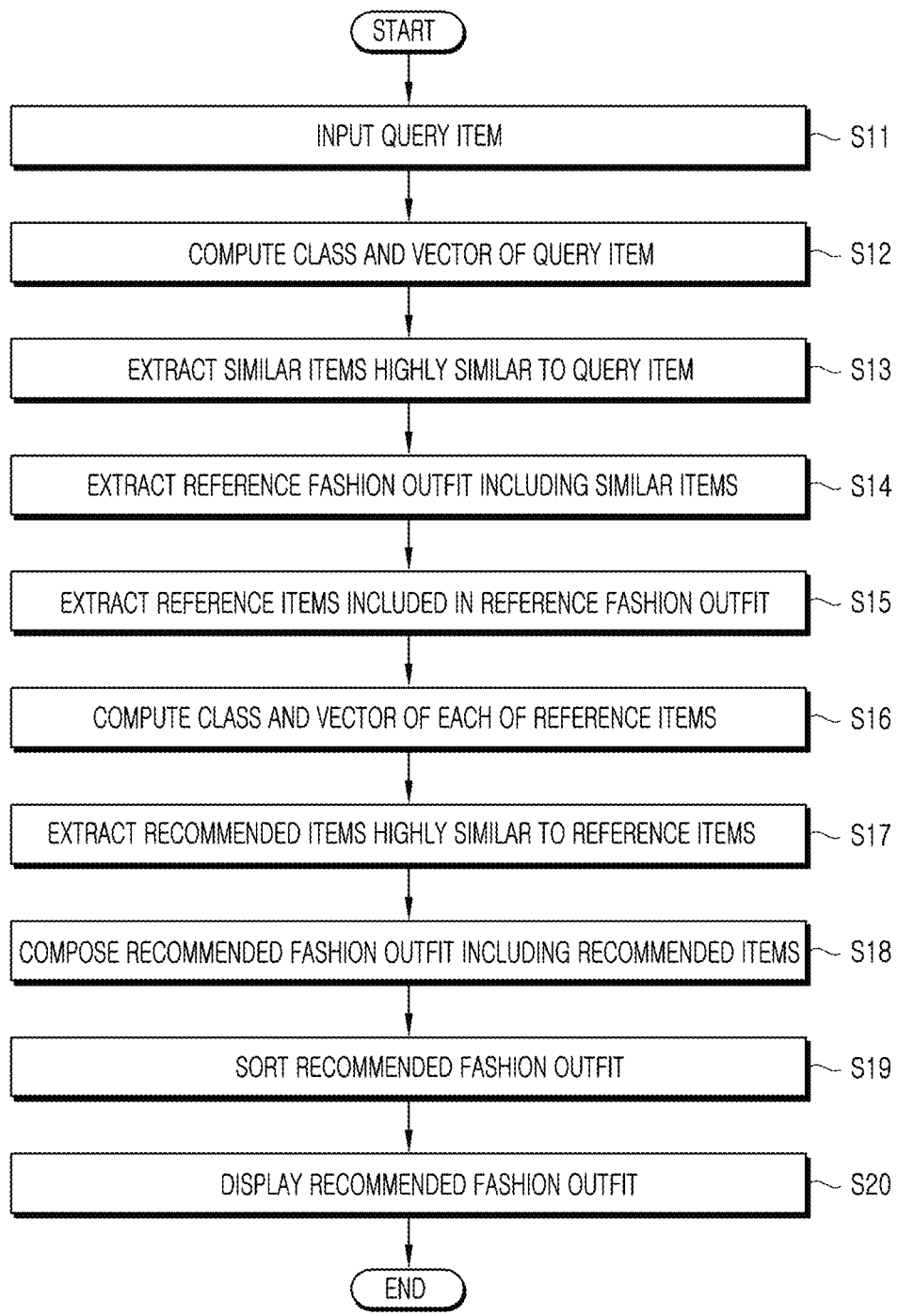
FIG. 3 is a flowchart showing an automatic fashion outfit composition and recommendation method according to an embodiment of the present invention.
Figure 4:
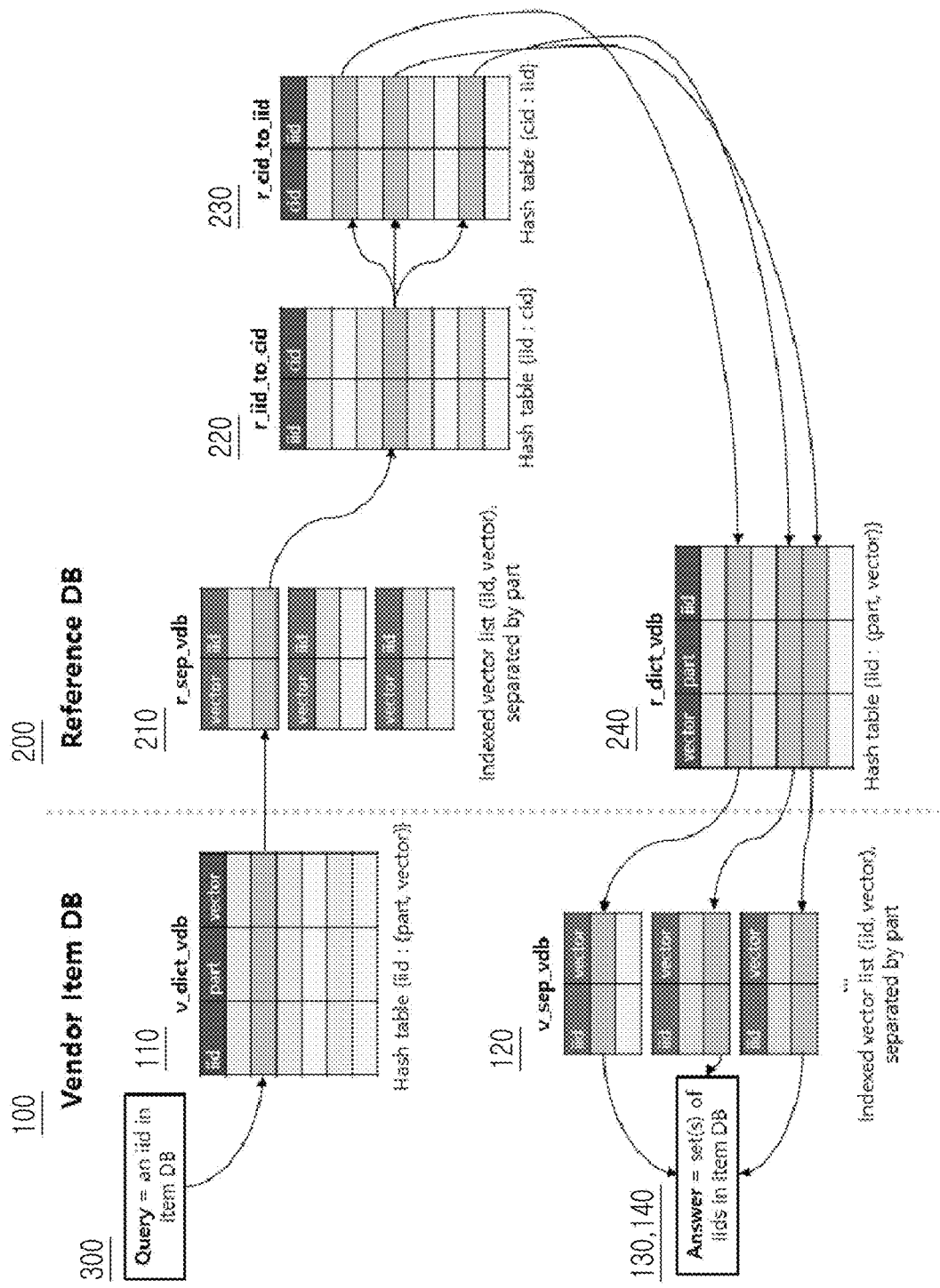
FIG. 4 is view showing the flow of various data by step of the automatic fashion outfit composition and recommendation system according to the embodiment of the present invention.

FIG. 3 is a flowchart showing an automatic fashion outfit composition and recommendation method according to an embodiment of the present invention, and FIG. 4 is view showing the flow of various data by step of the automatic fashion outfit composition and recommendation system according to the embodiment of the present invention.

The present invention provides an automatic fashion outfit composition and recommendation method including (A) a step of a user's query item 410 about fashion being input to the vendor item DB 100 and the vendor item DB 100 extracting the class (part) and the vector of the query item 410 and transmitting the extracted class (part) and vector of the query item 410 to the reference DB 200, (B) a step of the reference DB 200 retrieving and extracting similar items 420 having vectors that are highly similar to the vector of the query item 410 and then retrieving and extracting reference fashion outfit 430 including the similar items 420, (C) a step of the reference DB 200 extracting reference items 440 included in the reference fashion outfit 430, computing the class (part) and the vector of each of the reference items 440, and transmitting the computed class (part) and vector of each of the reference items 440 to the vendor item DB 100, (D) a step of the vendor item DB 100 retrieving and extracting recommended items 450 having vectors that are highly similar to the vectors of the reference items 440, (E) a step of the vendor item DB 100 combining the query item 410 and the recommended items 450 with each other in order to compose recommended fashion outfit 460, sorting the recommended fashion outfit 460, and transmitting the recommended fashion outfit 460 to a user.

The sequence by step of the automatic fashion outfit composition and recommendation method according to the present invention will be described hereinafter in detail.

First, the user's query item 410 about fashion is input to the vendor item DB 100 (S11). The query item 410 may be selected and input on a user terminal 300, or may be input through a display panel connected to the vendor item DB 100. The user may input the query item 410 such that other items suitable for the query item 410 selected by the user are recommended, and ultimately recommended items 450 suitable for the query item 410 are combined with the query item 410, and are presented to the user in the form of recommended fashion outfit 460.

Subsequently, the query item vector computation module 110 of the vendor item DB 100 extracts the class (part) and the vector of the query item 410, and transmits the extracted class (part) and vector of the query item 410 to the reference DB 200 (S12).

Referring to FIG. 4, a query item vector computation table (v_dict_vdb), which is a kind of hash table, is exemplarily shown as an example of the query item vector computation module 110.

In the present invention, each item has an identification key (iid), and the identification key (iid) may be stored in each of the vendor item DB 100 and the reference DB 200.

The query item vector computation table (v_dict_vdb) may rapidly retrieve and extract the class (part) and the vector of the query item based on the value of the identification key (iid) of the query item.

Subsequently, the similar item retrieval module 210 of the reference DB 200 retrieves and extracts similar items 420 having vectors that are highly similar to the vector of the query item 410 (S13).

Referring to FIG. 4, a similar item retrieval table (r_sep_vdb), which is a kind of hash table, is shown as an example of the similar item retrieval module 210. The similar item retrieval table (r_sep_vdb) extracts the identification key (iid) of a similar item 420 having a vector that is highly similar to the vector of the query item 410, and transmits the extracted identification key (iid) of the similar item 420 to the reference fashion outfit retrieval module 220.

The similar item retrieval table (r_sep_vdb) is indexed while being separated by the class (part) in order to efficiently retrieve similarity based on the vector. For rapid vector retrieval, indexing may be performed using a locality sensitive hashing scheme.

As needed, the similar item retrieval module 210 may retrieve and extract 5 to 10 similar items 420 having vectors that are highly similar to the vector of the query item 410, and may transmit the extracted similar items 420 to the reference fashion outfit retrieval module 220.

Subsequently, the reference fashion outfit retrieval module 220 retrieves and extracts reference fashion outfit 430 including the similar items 420 (S14).

In the present invention, a set of reference fashion outfit 430 is stored in the reference DB 200 in advance. Each of the reference fashion outfit may have an identification key (cid), and the identification key (cid) may also be stored in the reference DB 200.

Referring to FIG. 4, a reference fashion outfit retrieval table (r_iid_to_cid), which is a kind of hash table, is shown as an example of the reference fashion outfit retrieval module 220. The reference fashion outfit retrieval table (r_iid_to_cid) extracts the identification key (cid) of reference fashion outfit 430 including the extracted similar item 420, and transmits the extracted identification key (cid) of the reference fashion outfit 430 to the reference item extraction module 230.

At this time, it is possible to retrieve and extract the reference fashion outfit 430 in the order in which the fit scores of the fashion outfit that were input previously are relatively high through the reference fashion outfit evaluation module 250. As previously described, the fit scores of the fashion outfit may be the mean score obtained as the result of a plurality of consumers evaluating a plurality of sets of fashion outfit presented to the consumers.

Subsequently, reference items 440 included in the reference fashion outfit 430 are separated and extracted through the reference item extraction module 230 (S15).

Referring to FIG. 4, a reference item retrieval table (r_cid_to_iid), which is a kind of hash table, is shown as an example of the reference item extraction module 230.

The reference item retrieval table (r_cid_to_iid) extracts the identification key (iid) of the reference item 440 belonging to the reference fashion outfit 430 based on the identification key (cid) of the extracted reference fashion outfit 430, and transmits the extracted identification key (iid) of the reference item 440 to the reference item vector computation module 240.

However, the reference item extraction module 230 removes an item having the same class (part) as the query item 410 from among the reference fashion outfit 430, and extracts an item having a class (part) different from the class (part) of the query item 410 as a reference item 440. The reason for this is that it is necessary to combine the query item 410 with a different class of item suitable for the query item 410 in order to present recommended fashion outfit while retaining the query item 410, in which the user is interested.

Subsequently, the class (part) and the vector of each of the reference items 440 are computed through the reference item vector computation module 240, and the computed class (part) and vector of each of the reference items 440 are transmitted to the recommended item retrieval module 120 of the vendor item DB 100 (S16).

Referring to FIG. 4, a reference item vector computation table (r_dict_vdb), which is a kind of hash table, is shown as an example of the reference item vector computation module 240.

The reference item vector computation table (r_dict_vdb) extracts the class (part) and the vector of the reference item 440 based on the identification key (iid) of the reference item 440, and transmits the extracted class (part) and vector of the reference item 440 to the recommended item retrieval module 120.

Subsequently, the recommended item retrieval module 120 of the vendor item DB 100 retrieves and extracts recommended items 450 having vectors that are highly similar to the vectors of the reference items 440 (S17).

Referring to FIG. 4, a recommended item retrieval table (v_sep_vdb), which is a kind of hash table, is shown as an example of the recommended item retrieval module 120.

The recommended item retrieval table (v_sep_vdb) extracts the identification keys (iids) of the recommended items 450 having vectors that are relatively highly similar to the vectors of the reference items 440, and transmits the extracted identification keys (iids) of the recommended items 450 to the recommended fashion outfit composition module 130.

The recommended item retrieval table (v_sep_vdb) is also indexed while being separated by the class (part) in order to efficiently retrieve similarity based on the vector. For rapid vector retrieval, indexing may be performed using a locality sensitive hashing scheme.

The recommended item retrieval module 120 may retrieve and extract 5 to 10 recommended items 450 having vectors that are highly similar to the vectors of the reference items 440, and may transmit the extracted recommended items 450 to the recommended fashion outfit composition module 130.

Subsequently, the recommended fashion outfit composition module 130 combines the query item and the recommended items 450 with each other in order to compose a plurality of sets of recommended fashion outfit (S18).

Since the identification key (iid) of the query item and the identification keys (iids) of the newly transmitted recommended items are stored in the vendor item DB in advance, it is possible to easily generate recommended fashion outfit 460 based on the identification key (iid) of the query item and the identification keys (iids) of the recommended items.

Subsequently, the recommended fashion outfit sorting module 140 sorts the recommended fashion outfit 450 based on a predetermined criterion (S19). That is, the recommended fashion outfit are sorted in descending order based on the result obtained by multiplying two or more factors selected from among the fit score of reference fashion outfit, the value of the similarity of a similar item, and the value of the similarity of a recommended item or computing the mean value thereof, and the recommended fashion outfit sorted in descending order are transmitted to the user.

The number of recommended fashion outfit that are sorted may be 5 to 10. However, the present invention is not limited thereto. As needed, the recommended fashion outfit may be selected within a range of 5 to 100.

Finally, the step of displaying the sorted recommended fashion outfit 450 to the user is performed (S20).

That is, the recommended fashion outfit 450 may be transmitted from the recommended fashion outfit sorting module 140 to the user terminal 300 in order of sorting, or may be displayed to the user through a display screen connected to or attached to the vendor item DB 100.

Figure 5:
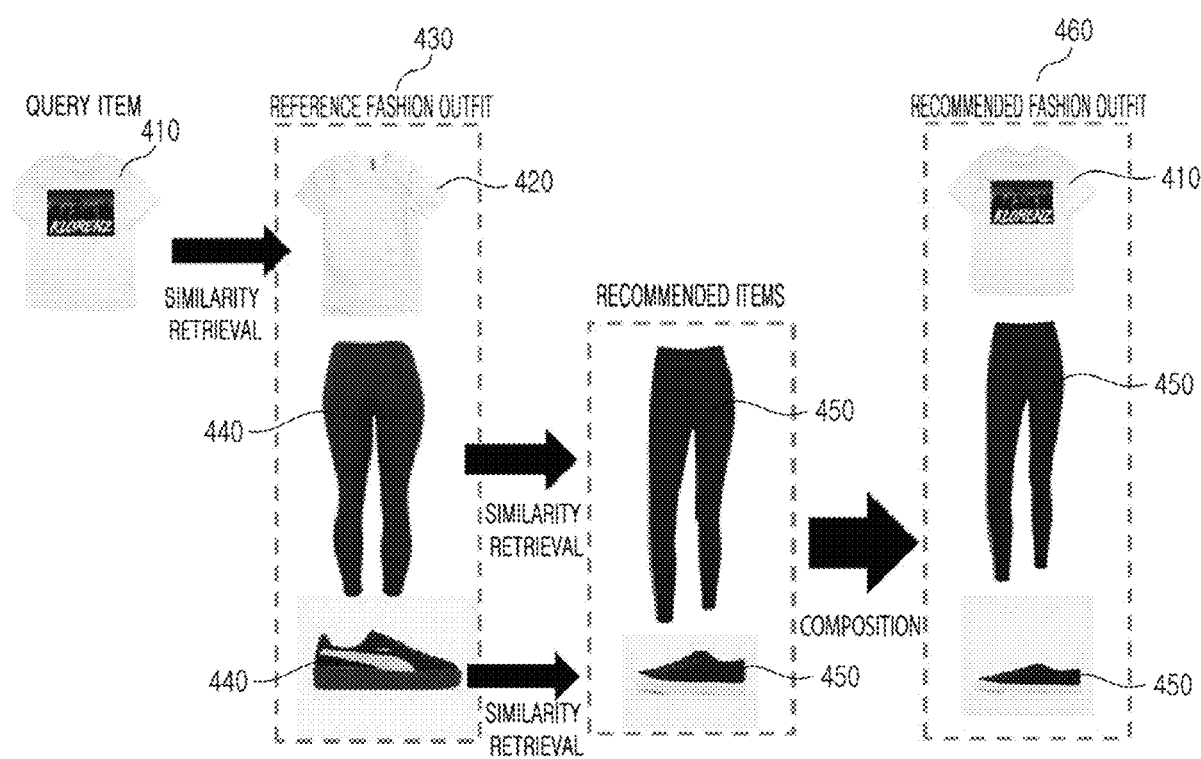
FIG. 5 is an illustrative view showing that recommended fashion outfit are displayed after a query item is input according to an embodiment of the present invention.

FIG. 5 is an illustrative view showing that recommended fashion outfit are displayed after a query item is input according to an embodiment of the present invention.

FIG. 5 briefly shows an automatic fashion outfit recommendation scheme according to the present invention. In the case in which a user selects and inputs a T-shirt as a query item 410, a T-shirt having a vector that is highly similar to the vector of the query item 410 is extracted as a similar item 420.

Reference fashion outfit 430 including the T-shirt extracted as the similar item 420 are retrieved and extracted. Thereafter, the similar item 420, which has the same class (part) as the query item 410 is removed from among the reference fashion outfit 430, and reference items 440, the class (part) of each of which is different from the class (part) of the query item 410, are extracted in order to retrieve and extract recommended items 450 having vectors that are highly similar to the vectors of the reference items 440.

That is, the recommended items 450 are limited to a bottom and shoes, the class (part) of each of which is different from the class (part) of the query item 410, and therefore ultimately the T-shirt, which is the query item 410, is combined with the bottom and the shoes, which are the recommended items 450, in order to compose recommended fashion outfit 460, which are then displayed to the user.

A single set of recommended fashion outfit 460 is shown in FIG. 5. In the case in which the user does not like the recommended fashion outfit 460 that are being displayed, however, a plurality of sets of recommended fashion outfit 460 sorted in descending order may be rapidly represented to the user such that the user can view the recommended fashion outfit 460.

Figure 6:
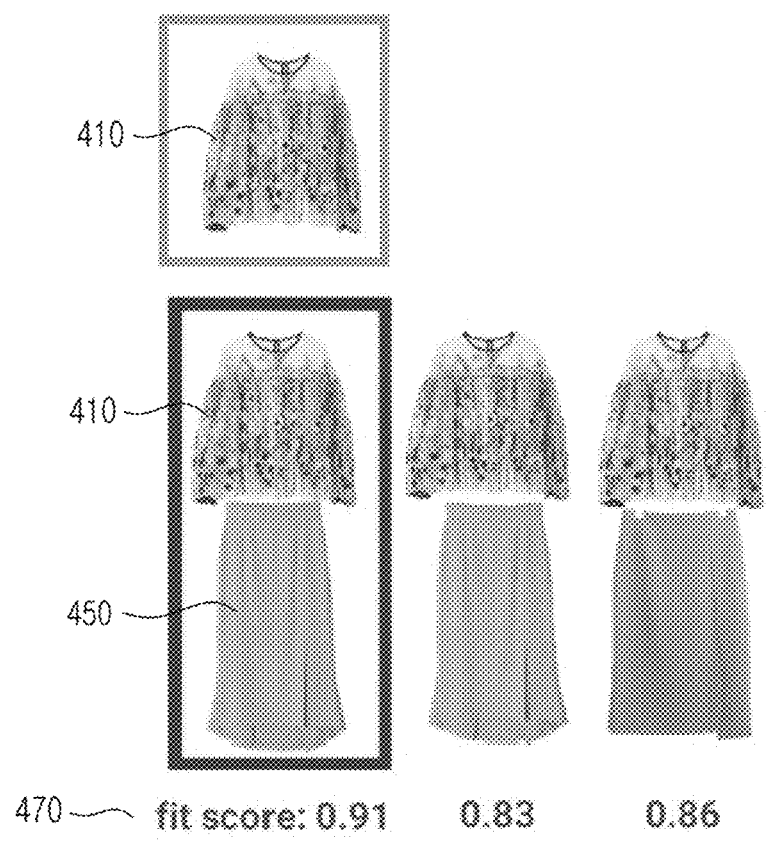
FIG. 6 is an illustrative view showing that recommended fashion outfit, in which a query item and a recommended item are combined with each other, are displayed according to an embodiment of the present invention.

FIG. 6 is an illustrative view showing that recommended fashion outfit, in which a query item and a recommended item are combined with each other, are displayed according to an embodiment of the present invention.

It can be seen from FIG. 6 that, in the case in which a user inputs a blouse as a query item 410, a plurality of skirts is recommended and presented as a recommended item 450 suitable for the query item 410.

In the present invention, recommended fashion outfit 460 may be displayed one by one, or a plurality of sets of recommended fashion outfit 460 may be displayed at once, according to the settings of the user terminal 300.

Meanwhile, since the recommended fashion outfit sorting module 140 of the vendor item DB 100 sorts recommended fashion outfit 460 in descending order based on the result obtained by multiplying two or more factors selected from among the fit score of reference fashion outfit, the value of the similarity of a similar item, and the value of the similarity of a recommended item or computing the mean value thereof, and displays the recommended fashion outfit sorted in descending order to the user, it is possible to also display the fit score of each set of recommended fashion outfit 460, as shown in the lower end of FIG. 6.

Figure 7:
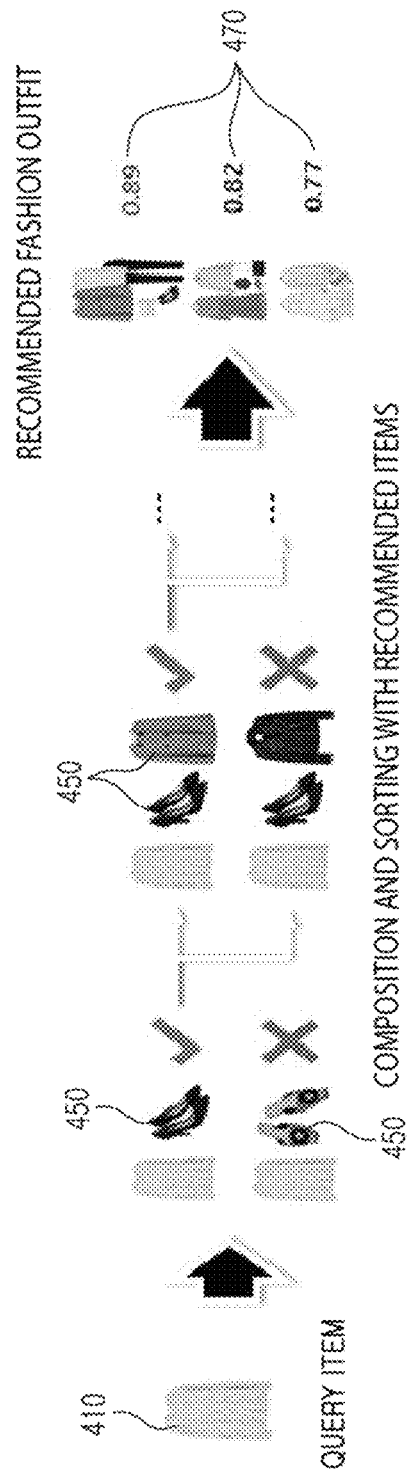
FIG. 7 is an illustrative view showing that a query item and recommended items are combined and sorted with each other according to an embodiment of the present invention.

FIG. 7 is an illustrative view showing that a query item and recommended items are combined and sorted with each other according to an embodiment of the present invention.

FIG. 7 shows that the recommended fashion outfit sorting module 140 sorts recommended fashion outfit 460 in descending order based on the result obtained by multiplying two or more factors selected from among the fit score of reference fashion outfit, the value of the similarity of a similar item, and the value of the similarity of a recommended item or computing the mean value thereof.

At this time, in the case in which a plurality of recommended items is combined with a query item 410, the result of any one of [(the fit score of the reference fashion outfit)×(the value of the similarity of the similar item)], [(the fit score of the reference fashion outfit)×(the value of the similarity of the recommended item)], (the value of the similarity of the similar item)×(the value of the similarity of the recommended item)], and [(the fit score of the reference fashion outfit)×(the value of the similarity of the similar item)×(the value of the similarity of the recommended item)] may be averaged for each recommended item, whereby it is possible to finally compute the fit score of each set of recommended fashion outfit.

In addition, as previously described, as needed, the recommended fashion outfit 460 may be sorted based on the result of any one of "the mean value of the fit score of the reference fashion outfit and the value of the similarity of the similar item," "the mean value of the fit score of the reference fashion outfit and the value of the similarity of the recommended item," "the mean value of the value of the similarity of the similar item and the value of the similarity of the recommended item," and "the mean value of the fit score of the reference fashion outfit, the value of the similarity of the similar item, and the value of the similarity of the recommended item."

Figure 8:
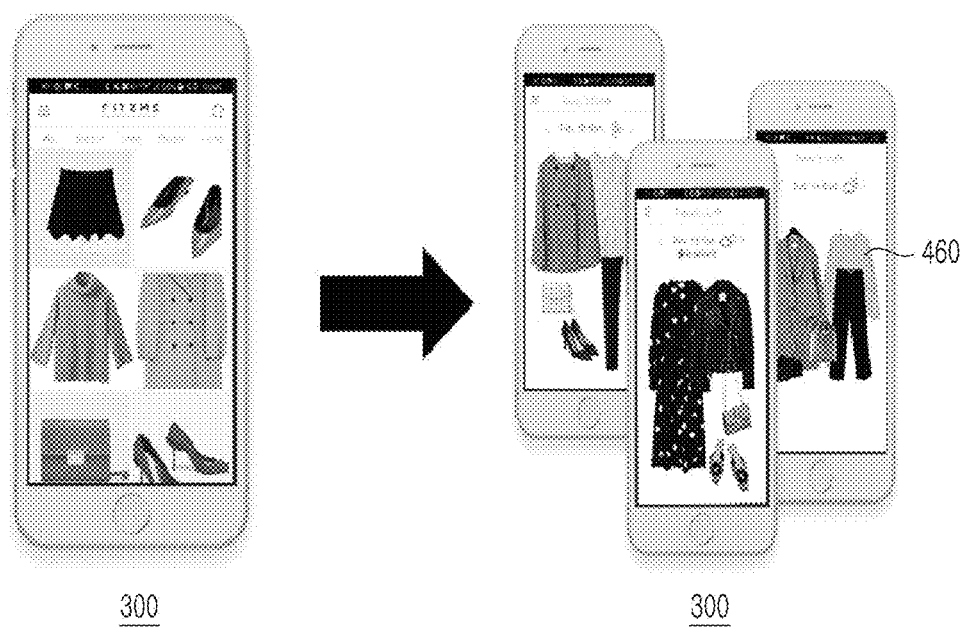
FIG. 8 is an illustrative view showing that recommended fashion outfit are displayed on a user terminal according to an embodiment of the present invention.
Figure 9:
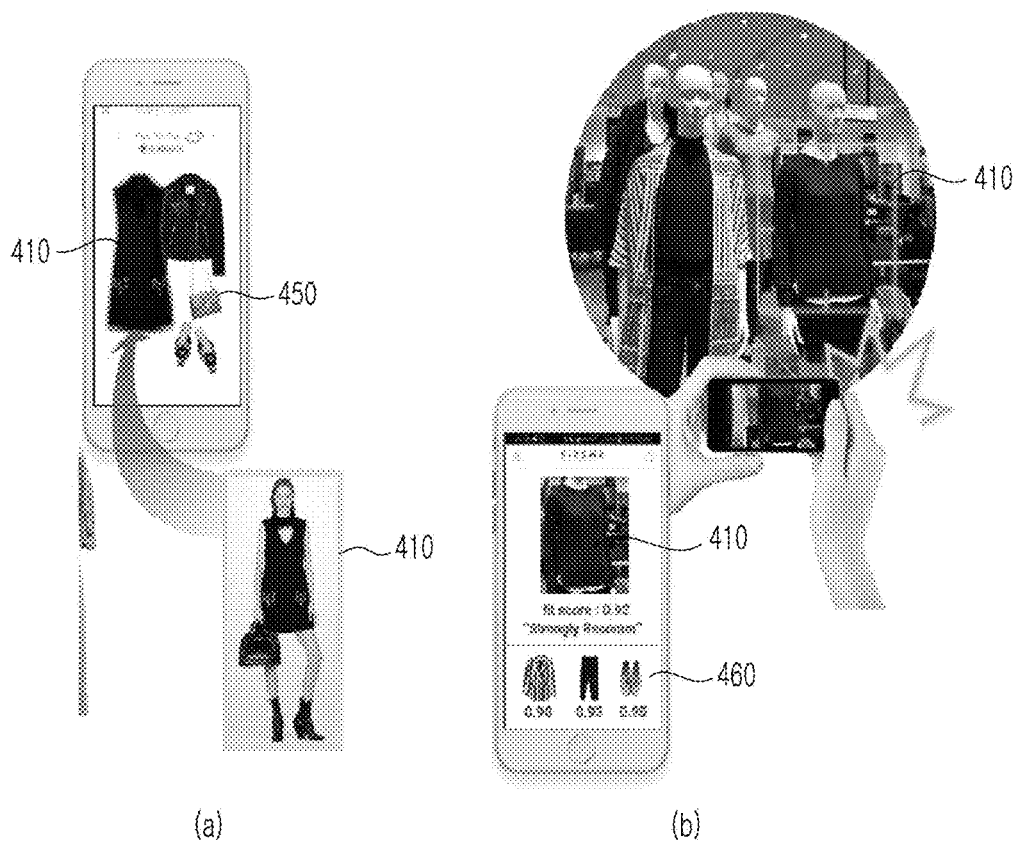
FIG. 9 is an illustrative view showing that a query item is input and recommended fashion outfit are displayed according to an embodiment of the present invention.

FIG. 8 is an illustrative view showing that recommended fashion outfit are displayed on the user terminal according to an embodiment of the present invention, and FIG. 9 is an illustrative view showing that a query item is input and recommended fashion outfit are displayed according to an embodiment of the present invention.

That is, in the present invention, it is possible for a user to access the vendor item DB 100 and to select and input any one of various classes of items stored in the vendor item DB 100 as a query item 410 or to select an item found during actual Internet search or an item photographed in a store as a query item 410 such that recommended fashion outfit 460 are presented to the user.

In the case in which the identification key (iid) of the item found during actual Internet search or the item photographed in the store is not stored in the vendor item DB 100, the query item may be replaced with an item having a vector that is the most similar to the vector of the query item, and then recommended fashion outfit 460 may be composed and presented.

According to the present invention, as described above, fashion items suitable for a fashion item that is input by a user may be automatically combined with the fashion item that is input by the user in order to present fashion outfit, wherein a similar item, a reference item, and a recommended item may be rapidly sorted using the class (part) and vector features of the fashion item in order to present a plurality of sets of completed fashion outfit, whereby it is possible to present a plurality of sets of fashion outfit having guaranteed fit scores within a short time and thus to increase purchasing power while improving user satisfaction.

As is apparent from the above description, according to an automatic fashion outfit composition and recommendation system and method of the present invention, it is possible to automatically combine fashion items suitable for a fashion item that is input by a user with the fashion item that is input by the user in order to present fashion outfit such that the user easily evaluates and purchases the fashion items.

In addition, according to the present invention, it is possible to rapidly sort a similar item, a reference item, and a recommended item using the class (part) and vector features of a fashion item in order to present a plurality of sets of completed fashion outfit, whereby it is possible to present fashion outfit capable of satisfying the user within a short time and thus to increase purchasing power while improving user satisfaction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic fashion outfit composition and recommendation method comprising:
   (A) a user's query item about fashion being input to a vendor item database (DB) and the vendor item DB extracting a class (part) and a vector of the query item and transmitting the extracted class (part) and vector of the query item to a reference DB;
   (B) the reference DB retrieving and extracting similar items having vectors that are highly similar to the vector of the query item and then retrieving and extracting a reference fashion outfit comprising the similar items;
   (C) the reference DB extracting reference items included in the reference fashion outfit, computing a class (part) and a vector of each of the reference items, and transmitting the computed class (part) and vector of each of the reference items to the vendor item DB;
   (D) the vendor item DB retrieving and extracting recommended items having vectors that are highly similar to the vectors of the reference items; and
   (E) the vendor item DB combining the query item and the recommended items with each other in order to compose a recommended fashion outfit, sorting the recommended fashion outfit, and transmitting the recommended fashion outfit to a user.

2. The automatic fashion outfit composition and recommendation method according to claim 1, wherein step (A) comprises a query item vector computation module of the vendor item DB extracting the class (part) and the vector of the query item and transmitting the extracted class (part) and vector of the query item to the reference DB.

3. The automatic fashion outfit composition and recommendation method according to claim 1, wherein step (B) comprises:
   a similar item retrieval module of the reference DB retrieving and extracting similar items having vectors that are highly similar to the vector of the query item; and
   a reference fashion outfit retrieval module of the reference DB retrieving and extracting reference fashion outfit comprising the similar items.

4. The automatic fashion outfit composition and recommendation method according to claim 1, wherein step (C) comprises:
  separating and extracting reference items included in the reference fashion outfit through a reference item extraction module of the reference DB; and
  computing the class (part) and the vector of each of the reference items through a reference item vector computation module of the reference DB and transmitting the computed class (part) and vector of each of the reference items to the vendor item DB.

5. The automatic fashion outfit composition and recommendation method according to claim 1, wherein step (D) comprises a recommended item retrieval module of the vendor item DB retrieving and extracting recommended items having vectors that are highly similar to the vectors of the reference items.

6. The automatic fashion outfit composition and recommendation method according to claim 1, wherein step (E) comprises:
  a recommended fashion outfit composition module of the vendor item DB combining the query item and the recommended items with each other in order to compose recommended fashion outfit; and
  a recommended fashion outfit sorting module of the vendor item DB sorting the recommended fashion outfit and displaying the recommended fashion outfit to the user in order of sorting.

7. The automatic fashion outfit composition and recommendation method according to claim 1, wherein step (C) comprises removing an item having an identical class (part) to the query item from among the reference fashion outfit and extracting an item having a class (part) different from the class (part) of the query item as a reference item.

8. The automatic fashion outfit composition and recommendation method according to claim 1, wherein step (C) comprises retrieving and extracting the reference fashion outfit in the order in which fit scores of fashion outfit that were input previously are higher through a reference fashion outfit evaluation module of the reference DB.

9. The automatic fashion outfit composition and recommendation method according to claim 1, wherein step (E) comprises sorting recommended fashion outfit in descending order based on a result obtained by multiplying two or more factors selected from among a fit score of reference fashion outfit, a value of similarity of a similar item, and a value of similarity of a recommended item or computing a mean value thereof and transmitting the recommended fashion outfit sorted in descending order to the user.

10. The automatic fashion outfit composition and recommendation method according to claim 1, wherein step (B) comprises a similar item retrieval module of the reference DB retrieving and extracting 5 to 10 similar items having vectors that are highly similar to the vector of the query item.

11. The automatic fashion outfit composition and recommendation method according to claim 1, wherein step (D) comprises a recommended item retrieval module of the vendor item DB retrieving and extracting 5 to 10 recommended items having vectors that are highly similar to the vectors of the reference items.

12. An automatic fashion outfit composition and recommendation system comprising:
  a vendor item database (DB); and
  a reference DB, wherein
  the vendor item DB comprises:
    a query item vector computation module for extracting a class (part) and a vector of a user's query item that is input and transmitting the extracted class (part) and vector of the user's query item to the reference DB;
    a recommended item retrieval module for retrieving and extracting recommended items having vectors that are highly similar to vectors of reference items that are input from the reference DB;
    a recommended fashion outfit composition module for combining the user's query item and the recommended items with each other in order to compose a recommended fashion outfit; and
    a recommended fashion outfit sorting module for sorting the recommended fashion outfit and transmitting the sorted recommended fashion outfit to a user in order of sorting, and wherein
  the reference DB comprises:
    a similar item retrieval module for retrieving and extracting similar items having vectors that are most highly similar to the vector of the query item;
    a reference fashion outfit retrieval module for retrieving and extracting a reference fashion outfit comprising the similar items;
    a reference item extraction module for extracting reference items included in the reference fashion outfit; and
    a reference item vector computation module for computing a class (part) and a vector of each of the reference items and transmitting the computed class (part) and vector of each of the reference items to the vendor item DB.

13. The automatic fashion outfit composition and recommendation system according to claim 12, wherein the reference DB further comprises a reference fashion outfit fit evaluation module for retrieving and extracting reference fashion outfit in consideration of fit scores of fashion outfit.

14. The automatic fashion outfit composition and recommendation system according to claim 12, wherein the recommended fashion outfit sorting module sorts the recommended fashion outfit in descending order based on a result obtained by multiplying two or more factors selected from among a fit score of reference fashion outfit, a value of similarity of a similar item, and a value of similarity of a recommended item or computing a mean value thereof and transmits the recommended fashion outfit sorted in descending order to the user.

15. The automatic fashion outfit composition and recommendation system according to claim 12, wherein the reference fashion outfit is a group of only fashion outfits to which consumers give a predetermined score or a score higher than the predetermined score when a plurality of sets of fashion outfits is presented to the consumers in advance.

16. The automatic fashion outfit composition and recommendation system according to claim 12, wherein the class (part) of the item is classified as a top, a bottom, a coat, shoes, a bag, or another accessory.

17. The automatic fashion outfit composition and recommendation system according to claim 12, wherein the query item is input through a user terminal or is input through a display panel connected to the vendor item DB.

18. The automatic fashion outfit composition and recommendation system according to claim 12, wherein the similar item is identical in class (part) to the query item.

19. The automatic fashion outfit composition and recommendation system according to claim 12, wherein the fashion outfit are a set of fashion items comprising at least a top and a bottom or a set of fashion items further comprising at least one of shoes, a coat, a bag, or another accessory in addition to the top and the bottom.

\* \* \* \* \*